July 24, 1951  M. W. PATTON  2,561,882

PNEUMATIC GROUND CLEARING MACHINE

Filed April 2, 1946  2 Sheets-Sheet 1

INVENTOR
MATTHEW W. PATTON
ATTORNEY

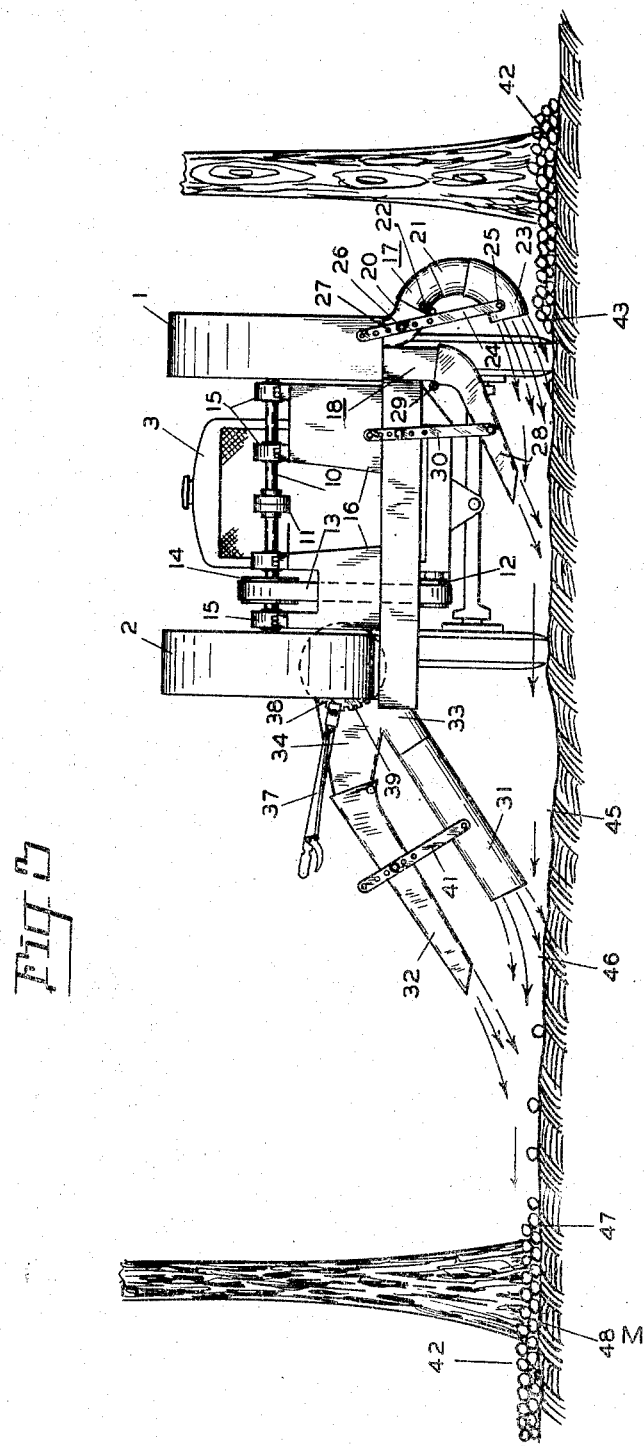

Patented July 24, 1951

2,561,882

UNITED STATES PATENT OFFICE 2,561,882

PNEUMATIC GROUND CLEARING MACHINE

Matthew W. Patton, Newberg, Oreg., assignor of one-half to Fred J. Patton, La Grande, Oreg.

Application April 2, 1946, Serial No. 659,122

2 Claims. (Cl. 15—405)

This invention relates in general to the clearing of a ground surface and particularly the clearing of the ground in nut orchards beneath the trees from which the nuts have dropped. Since the manual collecting of nuts from the ground is a slow and laborious task, various mechanical means have been tried for this purpose. However, the use of mechanical pickers is not entirely satisfactory, particularly with smaller nuts such as filberts and the like, due to the fact that the ground is rough, the nuts on the ground are frequently covered with leaves and debris, and persons walking on the ground, or vehicles driving over the ground, cause some of the nuts to be pressed into the ground and rendered practically uncollectible.

The principal object of the present invention is to provide a simple, practical means for collecting the nuts, as well as leaves and other debris, in rows or windrows on the ground so that the nuts can then be more efficiently gathered or picked up by scoops or mechanical pickers.

Another object of this invention is to cause the leaves and other light debris on the ground to be removed as much as possible from the nuts, thus facilitating the gathering of the nuts and eliminating a large portion of the debris, etc., which is ordinarily gathered with the nuts by mechanical pickers.

These and incidental objects I am able to attain by providing pairs of adjustably-mounted co-operating air-discharging pipes or nozzles, carried on a suitable vehicle, by providing a fan in association with the air nozzles, and by otherwise constructing and arranging my ground blower as hereinafter briefly described with reference to the accompanying drawings.

In the drawings:

Fig. 3 is a front elevation of my device and also illustrates, more or less diagrammatically, the manner and method of operation.

Figure 2:
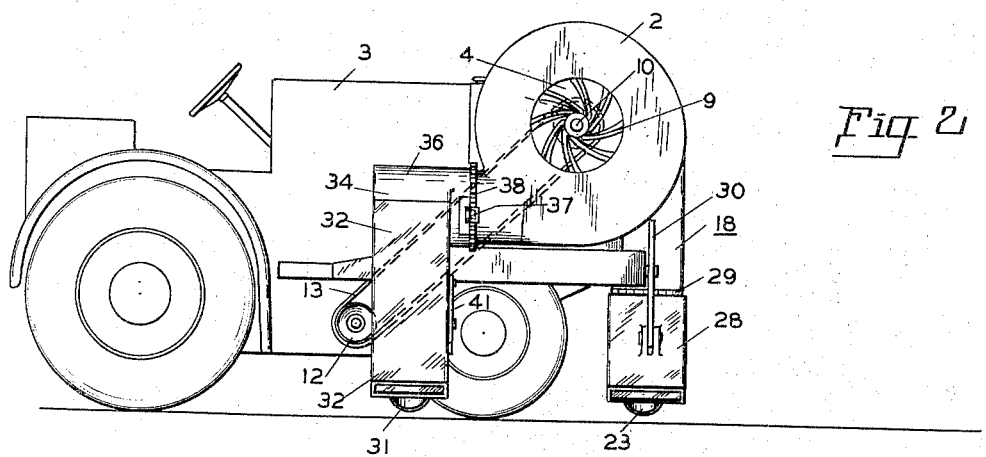
Fig. 2 is a side elevation of the same.
Figure 1:
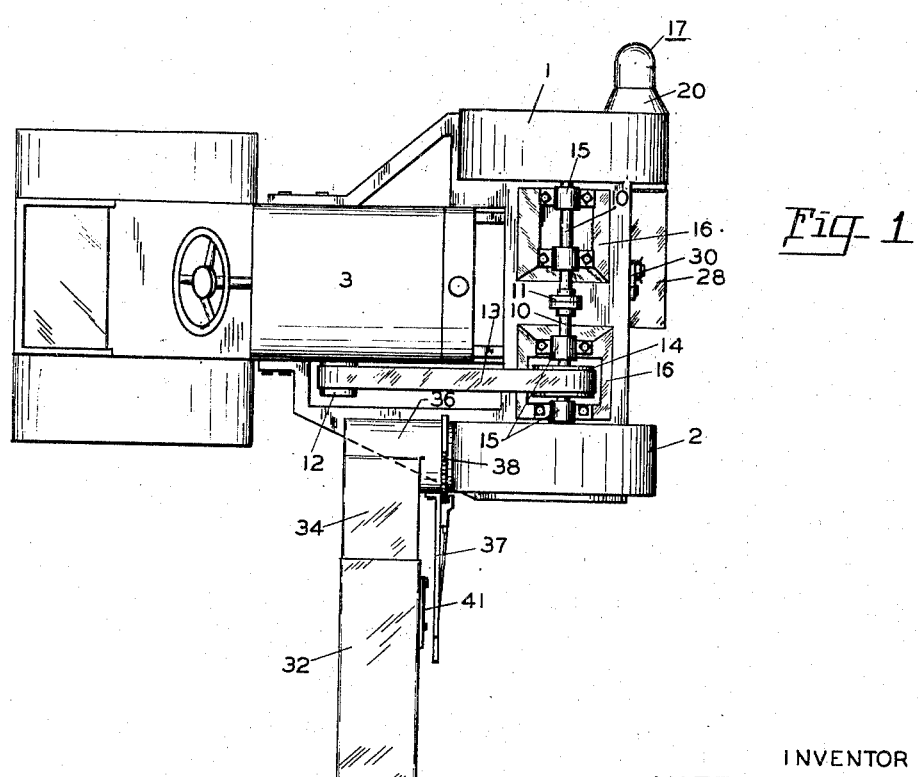
Fig. 1 is a plan view of my device.

Referring to Figs. 1, 2 and 3, a pair of blowers, 1 and 2, are mounted on a suitable vehicle or tractor 3, preferably in the positions shown. The blowers are located at opposite sides of the vehicle and are securely mounted on the platform or frame of the vehicle in any appropriate manner. Each blower contains a driven rotor or fan, one of such rotors or fans being indicated at 9 in Fig. 2, and these fans are mounted on shafts 10 which are preferably in axial alinement and have their inner ends coupled together at 11 so that the fans can conveniently be operated in unison. A pulley 14 is secured on one of the shafts 10, and a belt 13 drives this pulley from a suitable power take-off 12 of the tractor or vehicle. The shafts 10 are mounted in bearings 15 supported in the pedestals 16 which in turn are mounted on the vehicle frame or platform. Other means for mounting and driving the shafts 10 could of course be substituted for the means which I have described.

The air from blower 1 is delivered to two discharge pipes 17 and 18 (Fig. 3). The discharge pipe 17 consists of a stationary section 20 and an adjustable section 21 extending over the end of section 20 and hinged thereto at 22 so that the discharging end 23 of the lower section 21 can be arranged at any desired angle with respect to the surface of the ground. The discharging end 23 of the pipe, as will be noted from Fig. 3, is directed towards the vehicle path but is located a short distance outside of the vehicle path. The reason for this will be apparent later. The angularity of the discharging end 23 with the ground surface can be adjusted by means of the holding brace 24 which is pivotally attached to the pipe section at 25 and is provided with adjusting holes 27 for the fastening bolt 26.

Similarly the other discharging pipe 18 has a hinged lower section 28, hingedly mounted at 29, which is held in its desired position by a similar adjustable brace 30. The discharging end or nozzle of hinged section 28 of discharging pipe 18, as apparent from Fig. 3, is of narrower cross-sectional area than that of the companion hinged section 21, and, for reasons hereinafter explained, I have found it preferable to make the discharging ends of sections 21 and 28 substantially circular and rectangular in cross-section respectively.

The air from blower 2 is delivered into a housing section 36 which is rotatably mounted on the blower housing and which in turn has two discharge outlets 33 and 34. A discharge pipe or nozzle 31 is rigidly secured to the outlet 33. The discharge end of this pipe or nozzle 31 is substantially the same as that of pipe section 21 in cross-section.

To the outlet 34 a discharge pipe or nozzle 32 is hingedly attached. The cross-sectional area of this discharge pipe 32 is substantially the same as that of pipe section 28. An adjustable brace 41, similar to braces 24 and 30, supports the discharge pipe 32 in desired relationship with respect to its companion discharge pipe 31. The rotatable housing 36, and with it the discharge pipe 31, are held in desired position by means of a lever 37, which is secured to the rotatable housing 36, and which carries a spring-controlled pawl adapted to engage the teeth 39 of the rigidly-mounted quadrant 38.

The manner in which my device operates in clearing the ground surface and in the collecting of nuts on the ground will be briefly described with reference to Fig. 3. As the vehicle moves forward the strong current of air discharged from the pipe nozzle 23 in front of the vehicles strikes the ground in a transverse ground path in the direction indicated by the arrows and blows the nuts, leaves and debris on the ground towards the left (as viewed in Fig. 3), leaving a cleared line 43 at the right of the vehicle ( as viewed in Fig. 3). The current of air from the pipe nozzle 23 is strong enough to clear the ground entirely in front of the vehicle and blow the nuts, etc., out to the left, for example, to some point 45. However, this air blast from pipe nozzle 23 would, unless otherwise restricted, have a tendency to create a circular current of air with the result that the leaves, debris, and some of the lighter nuts would be carried upwardly by the air currents and scattered, and settle back down in the path left by the vehicle. However, the air from the second pipe nozzle 28 prevents this by producing a strong second current which impinges on the current which has moved over the ground from pipe 23 and tends to keep the first current along the ground for a greater distance thus causing leaves and debris as well as the heavier nuts to be blown to the side somewhat beyond point 45, for example, the heavier nuts will be blown to some point such as 46 and the lighter material will be blown still further to the left. I have found that this second current of air delivered by pipe nozzle 28 is more effective in accomplishing its purpose if it is delivered in a broad, flattened stream and accordingly the cross-section of the discharging pipe nozzle 28 is preferably rectangular, as previously described.

The second pair of discharging pipe nozzles 31 and 32 function in the same manner. Thus the air blast from pipe 31 engages the nuts and any other material remaining at point 46 and blows this over to the left and the air from pipe 32, similarly by impinging on the current from pipe 31, holds the currents to the ground, causing the nuts to be collected in a windrow to the left of some point such as 47 and the leaves and light debris to be scattered further to the left and beyond the windrow 48 of the nuts. The next trip of my device will then be to the left of windrow 48 (as viewed in Fig. 3) and thus make a clear border line at the left of windrow 48 corresponding to the border line 43 to the left of the first row 42.

With very little effort, with the use of my device, I have been able to collect the nuts in filbert orchards into narrow windrows, with most of the leaves and debris cleared, so that the gathering of the nuts by means of a scoop or mechanical picker is considerably facilitated.

The arrangement of the air-discharging pipes in pairs is an important feature of my invention, for I have found that the use of a single pipe, such as the discharging pipe nozzle 23, without a companion nozzle 28 impinging a second blast upon the first, will not produce sufficiently satisfactory results.

The angles at which the blasts of air should be directed towards the ground to produce most efficient results will best be determined by trial. In general the angles will be similar to those illustrated in Fig. 3. However, the adjusting means which I have provided enable these angles to be adjusted slightly to suit different ground slopes and conditions.

It will frequently happen that, when the nuts are to be gathered from the ground, there will still be some nuts in the trees which have not dropped to the ground, for one reason or another. These nuts may still be attached or they may have dropped into forks in the branches, etc., instead of falling to the ground. In such cases the air blasts from blower can be used to dislodge such nuts and cause them to drop to the ground. Thus, since the housing portion 36 is rotatably mounted, as previously described, the housing 36, and with it the attached outlet pipes, can be rotated by means of the lever 37 and the discharging outlets directed upwardly towards either side row of trees as desired, blowing the nuts loose from the trees. While this is being done the air blasts from outlets 23 and 28 will keep the path cleared of nuts ahead of the vehicle so that no nuts will be lost by being pressed into the ground under the vehicle. A second trip of my device between such rows with the housing 36 rotated back to the position shown in Fig. 3 will then generally be necessary to collect all the nuts in the desired windrows. However, comparatively little time is required for such a second trip of my device along such path.

Various modifications could of course be made in the construction of the device which I have shown and described without departing from the principle of my invention, but the device illustrated I have found to be very satisfactory in actual operation.

I claim:

1. In a pneumatic ground clearing machine, a vehicle, a blower device mounted on said vehicle, a pair of air-discharging pipes leading from said blower device, said pipes arranged in the same vertical plane extending transversely with respect to the vehicle, the discharging mouths of both pipes located near the ground and one of said mouths discharging air in a transverse ground path to move debris on the ground in a transverse direction with respect to the vehicle, the other discharging mouth located in the same transverse vertical plane a short distance ahead transversely of said first mentioned mouth and discharging air obliquely downwardly onto and into said transverse ground path, whereby the air from said second mentioned mouth by being impinged upon the ground air current set up by said first mentioned mouth will prevent the tendency of said ground air current and the debris carried with it to rise from the surface of the ground.

2. A pneumatic ground clearing machine of the character described including a vehicle, a pair of blowers mounted at opposite sides of said vehicle, a pair of air-discharging pipes leading from each of said blowers, the pipes of each pair arranged in the same vertical plane extending transversely with respect to the vehicle, the discharging mouths of all four pipes located near the ground, one of the discharging mouths of each pair of pipes discharging air in a transverse ground path to move debris on the ground in a transverse direction with respect to the vehicle, the other discharging mouth in each pair located a short distance ahead transversely of the first mentioned mouth and discharging air obliquely downwardly onto and into the transverse ground path of the air from the first mentioned mouth, whereby the air from said second mentioned mouth of each pair will be impinged upon the ground air current set up by said first mentioned mouth of the pair and will prevent the tendency of said ground air current and the debris carried with it to rise from the surface of the ground.

MATTHEW W. PATTON.

REFERENCES CITED

The following references are of record in the file of this patent:

UNITED STATES PATENTS

| Number | Name | Date |
|---|---|---|
| 490,269 | Chisholm | Jan. 24, 1893 |
| 514,805 | Astor | Feb. 13, 1894 |
| 1,193,475 | Smith | Aug. 1, 1916 |
| 1,243,516 | Harris | Oct. 16, 1917 |
| 1,330,547 | Mehlhaf | Feb. 10, 1920 |
| 1,375,482 | Bartlett | Apr. 19, 1921 |
| 1,399,165 | Spencer | Dec. 6, 1921 |
| 1,729,754 | Wenrich | Oct. 1, 1929 |
| 1,812,942 | Gaines | July 7, 1931 |
| 2,175,608 | Lawrence | Oct. 10, 1939 |
| 2,180,269 | Wisher | Nov. 14, 1939 |